United States Patent [19]

Parkinson

[11] Patent Number: 4,706,581
[45] Date of Patent: Nov. 17, 1987

[54] FOSSIL FUEL FURNACE REACTOR

[75] Inventor: William J. Parkinson, Los Alamos, N. Mex.

[73] Assignee: The United States of America as represented by the United States Department of Energy, Washington, D.C.

[21] Appl. No.: 925,598

[22] Filed: Oct. 31, 1986

[51] Int. Cl.⁴ ............................................. F23B 7/00
[52] U.S. Cl. .................................. 110/349; 73/865.6; 110/185; 110/341
[58] Field of Search ............... 110/185, 341, 349, 229, 110/230; 73/865.6

[56] References Cited

U.S. PATENT DOCUMENTS 4,637,346  1/1987  Draper et al. ................. 73/865.6 X
4,640,233  2/1987  Draper et al. ................. 73/856.6 X Primary Examiner—Edward G. Favors
Attorney, Agent, or Firm—Ray G. Wilson; Judson R. Hightower

[57] ABSTRACT

A fossil fuel furnace reactor is provided for simulating a continuous processing plant with a batch reactor. An internal reaction vessel contains a batch of shale oil, with the vessel having a relatively thin wall thickness for a heat transfer rate effective to simulate a process temperature history in the selected continuous processing plant. A heater jacket is disposed about the reactor vessel and defines a number of independent controllable temperature zones axially spaced along the reaction vessel. Each temperature zone can be energized to simulate a time-temperature history of process material through the continuous plant. A pressure vessel contains both the heater jacket and the reaction vessel at an operating pressure functionally selected to simulate the continuous processing plant. The process yield from the oil shale may be used as feedback information to software simulating operation of the continuous plant to provide operating parameters, i.e., temperature profiles, ambient atmosphere, operating pressure, material feed rates, etc., for simulation in the batch reactor.

8 Claims, 5 Drawing Figures ns and, more particularly, to high-pressure, high-temperature retort furnaces for use in fossil fuel yield experiments. This invention is the result of a contract with the Department of Energy (Contract No. W-7405-ENG-36).

FOSSIL FUEL FURNACE REACTOR

BACKGROUND OF INVENTION

This invention relates to experimental furnace reactors and, more particularly, to high-pressure, high-temperature retort furnaces for use in fossil fuel yield experiments. This invention is the result of a contract with the Department of Energy (Contract No. W-7405-ENG-36).

There are many fuel resources which are not directly recoverable and/or usable. Resources such as oil shale, coal, and tar sands can be subjected to treatments involving high temperatures and pressures in a variety of atmospheres to produce fuel resources in a more useful form. Typically such production is done in a continuous retort where the solid fuel bearing material is passed through the retort and the reaction products, gas and/or liquid, are collected. Optimum process conditions vary from retort-to-retort and from source material-to-source material.

The production of usable fuel resources from complex fuel bearing materials involves expensive processing plants. Further, the various derivative products from such processing realize a variety of prices in the marketplace. Accordingly, an optimum return from such processing plants is determined not only by a yield as measured by barrels of oil but also by the production cost per barrel of oil. Indeed, the optimum economic conditions may not correspond to the optimum yield in barrels of oil. Computer software, e.g., ASPEN developed under sponsorship of the U.S. Government, provides a capability for computer modeling processing plants. A variety of plant design parameters, such as hydrodynamic and thermodynamic modeling, can be provided. However, the ASPEN code requires feedback inputs of the raw material yields from the process conditions included in the plant modeling.

Process yield data in a feedback mode is provided by the present invention, where a fossil fuel furnace reactor is provided.

Accordingly, it is an object of the present invention to provide batch process yield data functionally related to a continuous plant process yield under a variety of operating conditions.

It is another object of the present invention to provide for expedited initialization of a batch reactor for operating in a feedback mode.

Still another object is to simulate continuous process conditions with a batch reactor.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

To achieve the foregoing and other objects, and in accordance with the purposes of the present invention, as embodied and broadly described herein, the apparatus of this invention may comprise a fossil fuel furnace reactor system. An interior reactor vessel is provided for containing a batch of sample material having fossil fuel content. The vessel has a wall thickness which is effective for heat transfer at a predetermined rate to simulate a selected continuous processing plant for the sample materials. A heater jacket is disposed about the reaction vessel and defines a plurality of independent controllable temperature zones axially spaced along the reaction vessel. A pressure vessel is then insulatingly disposed about the heater jacket and defines a wall thickness which is effective to contain an operating pressure functionally selected to simulate the continuous processing plant being analyzed.

In another characterization of the present invention, a batch retort process is provided for simulating the operation of a continuous fossil fuel treatment plant. A selected quantity of a sample material containing fossil fuels is placed in a reaction vessel. A plurality of heating zones is defined about the sample material. A zone heating profile is established to simulate a time-temperature history of a selected plant design for continuously processing a feed material corresponding to the sample material. The heating zones are then sequentially energized at intervals effective to simulate a material feed rate through the selected plant.

The fuel materials, both gas and liquid, evolved from the sample materials in the above apparatus and using the above process may then be analyzed for use in the computer program simulating operation of the continuous processing plant. Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF A PREFERRED EMBODIMENT

Figure 1:
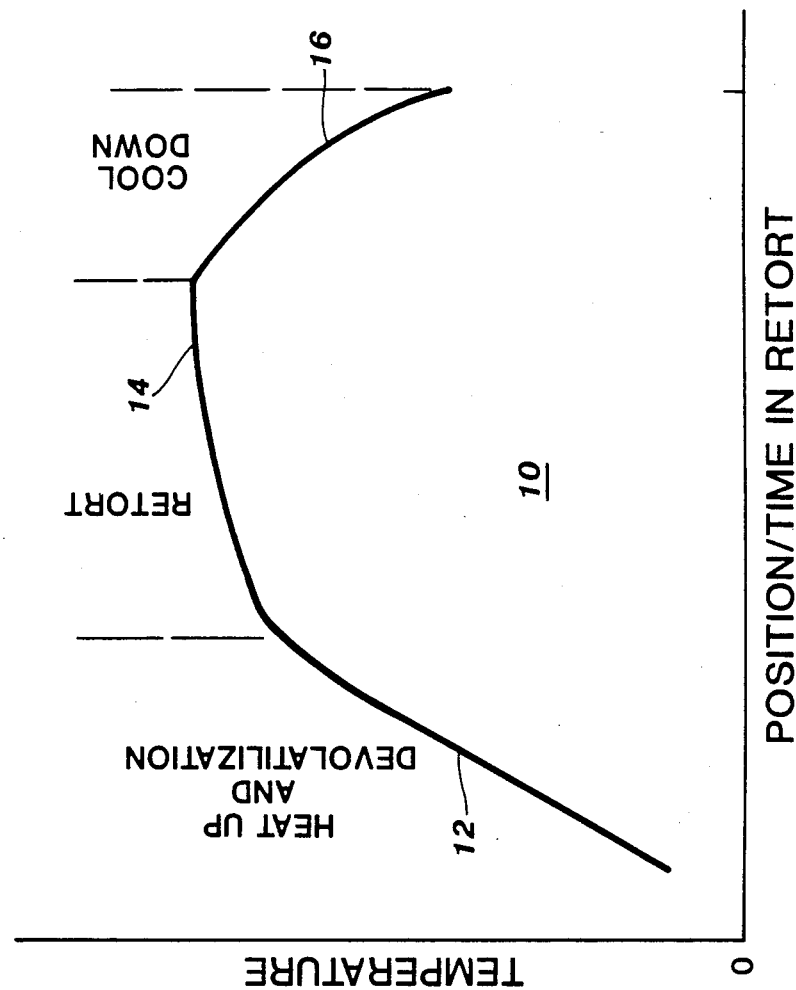
FIG. 1 is a graphical representation of the temperature of the fuel bearing material as a function of the time the material is passing through a continuous process retort.

In a continuous processing plant for deriving usable fossil fuel materials from complex raw materials, a conventional process subjects the raw materials to high temperatures for a period of time to volatize fuel products within the material. The yield of fuel material, i.e., the mixture of gaseous and liquid hydrocarbons and useful byproducts such as ammonia, hydrogen sulfide, and carbon monoxide, is effected by the operating pressure and the surrounding process atmosphere during traverse of the processing retort by the raw material. FIG. 1 depicts a typical temperature profile along the length of a continuous retort and it will be appreciated that the profile can be converted to a time temperature history by dividing the length by a selected feed rate for the raw material.

It will be appreciated from FIG. 1 that there is an entrance regime for heating up and devolatization of the process material. A relatively steady state temperature regime is then provided where selected reaction gases flow over the solid materials to produce both gaseous and liquid products. The process material is then cooled down to recover heat for reuse in the process and to facilitate handling of the residual material exiting the retort.

In accordance with one embodiment of the present invention, a time-temperature history simulating a selected continuous retort processing profile, such as shown in FIG. 1, is provided for a batch process. A plurality of heater zones 22, 24, and 26 having time-temperature characteristics shown in profiles 32, 34, and 36, respectively, are depicted in FIGS. 2A, 2B, and 2C. Each of the temperature control profiles 32, 34, 36 is identical with a time-temperature history seen by material being processed in a selected continuous processing plant, as depicted in FIG. 1.

Each heater zone 22, 24, 26 is individually controllable and is typically energized to provide the heat zone temperature profiles depicted in FIGS. 2A, 2B, and 2C, respectively. It will be understood that while each temperature profile shown in FIGS. 2A, 2B, and 2C is conventionally identical, a variety of profile curves could be provided. It will also be understood that only three controllable zones are provided for purposes of illustration and not of limitation.

Figure 2:
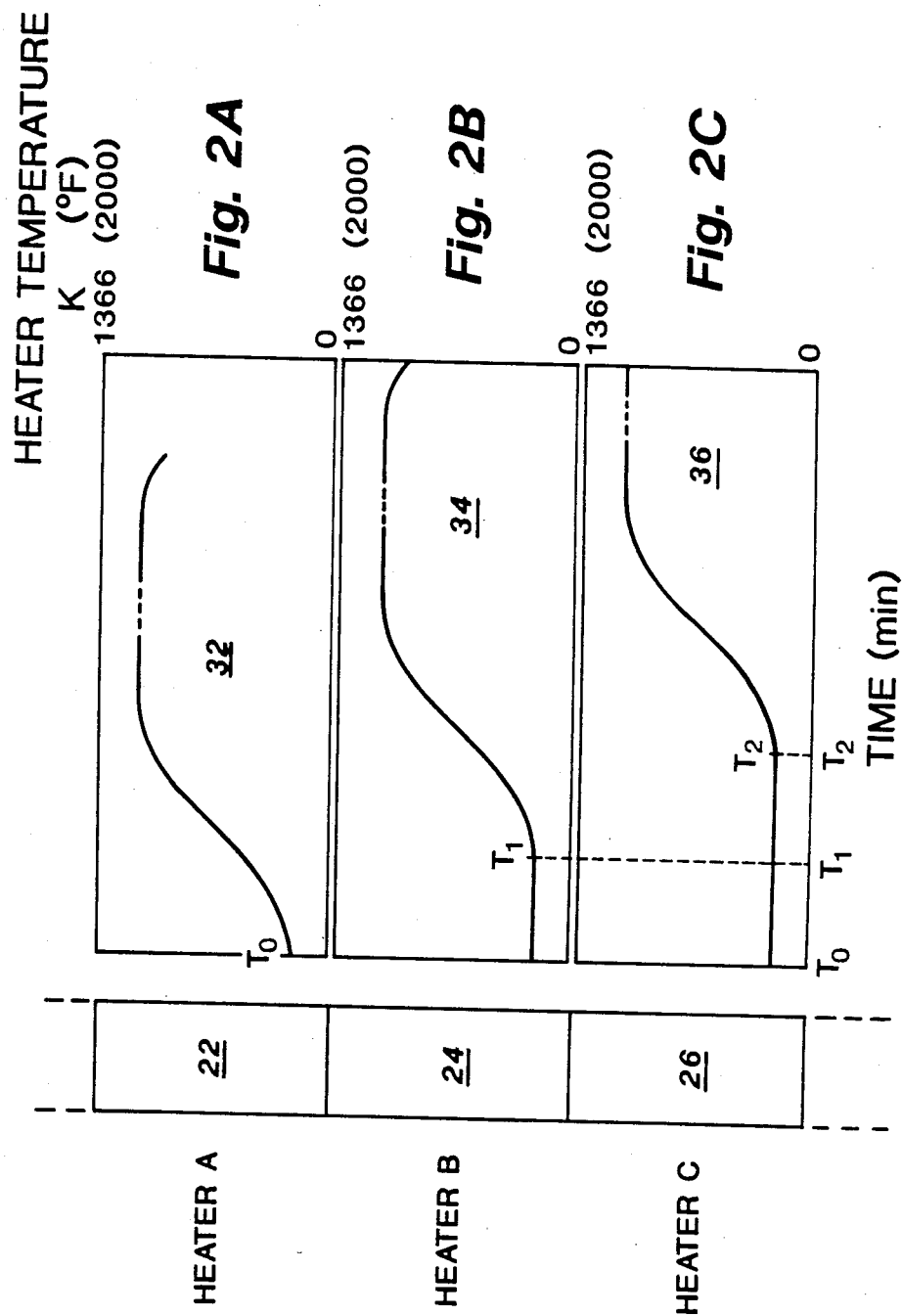
FIGS. 2A, 2B, and 2C are graphical representations of zone heating profiles according to one embodiment of the present invention.

As illustrated by FIG. 2, the plurality of heat zones 22, 24, 26 enable a variety of material feed rates to be simulated. Each zone preferably contains the same batch quantity of raw material. A control system (Figure 3) energizes heater A 22 at time $T_0$, heater B 24 at time $T_1$, and heater C 26 at time $T_2$. The time interval between energizing successive heaters is selected to represent the material feed rate, i.e., a mass of material per selected unit time. The time intervals can thus be varied to simulate selected feed rates. It will also be appreciated from FIG. 2 that the time-temperature profile curve can be altered to affect both the heat up rate and the substantially constant steady state temperature.

Figure 3:
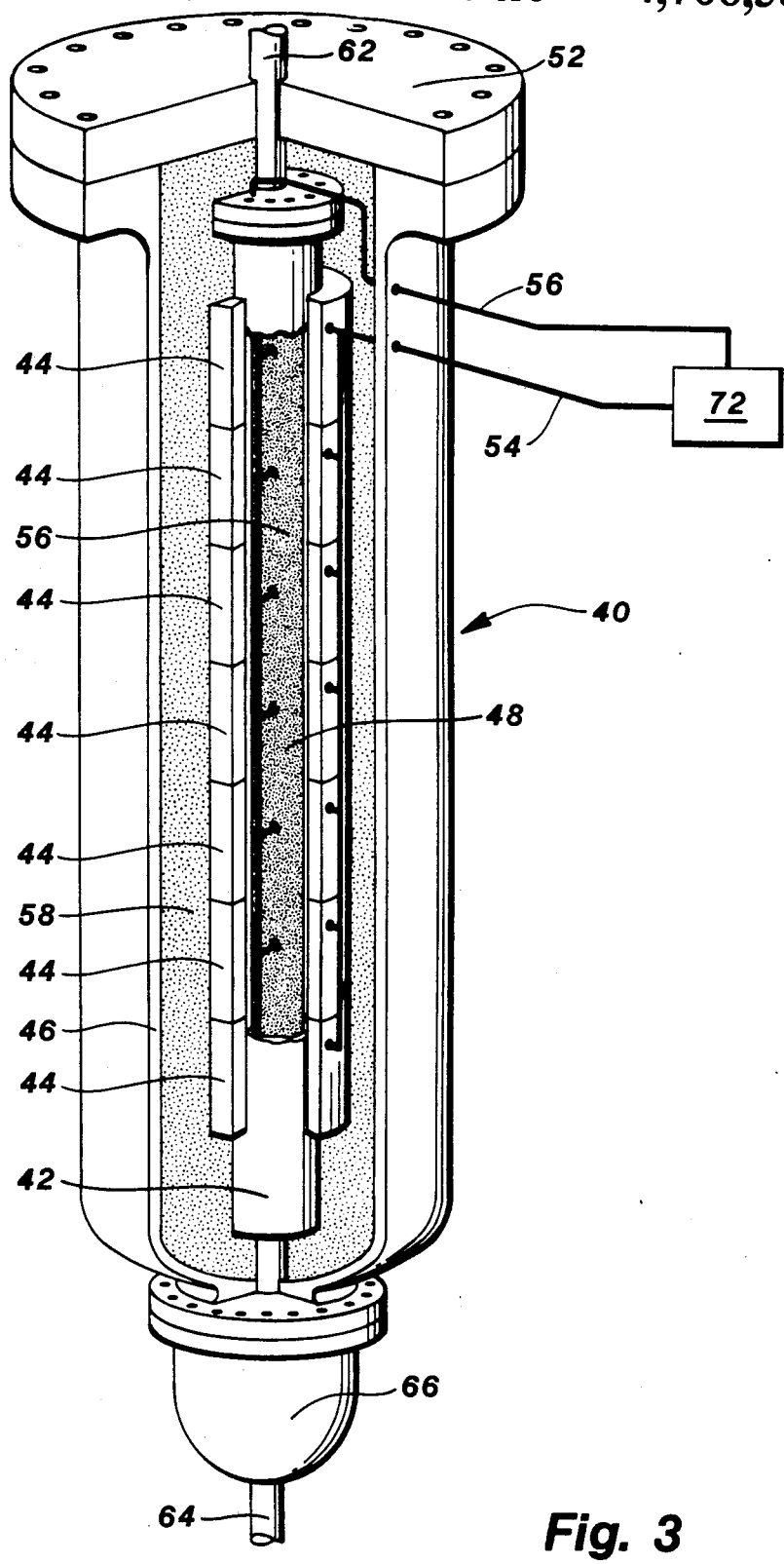
FIG. 3 is a pictorial illustration in partial cutaway of a furnace reactor according to one embodiment of the present invention.

Referring now to FIG. 3 there is depicted a pictorial illustration, in partial cutaway, of a fossil fuel furnace reactor 40 according to one embodiment of the present invention. The combonents include reaction vessel 42 for containing and heating a selected batch quantity of sample material 48, which may be an oil shale. Heater jacket 44 is disposed about reaction vessel 42 and defines a plurality of heat zones along the length of reaction vessel 42. An external pressure vessel 46 is provided to contain the internal sample materials and retort components and to provide for only small differential pressures in the interior of pressure vessel 46.

Closure 52 is provided on pressure vessel 46 to enable quick access to the interior of pressure vessel 46 for removing reaction vessel 42 and replacing sample material 48. Heater power lines 54 are connected through pressure vessel 46 to heated zones 44 and comprise a plurality of wires for individually connecting heated zones 44 with a power supply.

In addition to the above components, instrumentation is provided to assist in maintaining a desired temperature profile in a sample material volume adjacent each of the heated zones 44. Instrumentation lines 56, which may conveniently be thermocouples, are provided within the sample material 48 volume and operatively adjacent each of the zones defined by heater jacket 44 for temperature control. Sample material temperature signals are provided on instrumentation lines 56 to a conventional temperature controller 72, which may conveniently be a microprocessor based control system programmed to replicate the time-temperature profiles of interest. Temperature control unit 72 then sequentially energizes heater zones defined in heater jacket 44 to simulate a continuous material feed rate through a full scale processing plant of interest.

Gas inlet 62 and outlet 64 are provided for maintaining the desired processing gas stream atmosphere about sample material 48. Conventionally, a hydrogen rich atmosphere may be used to enhance hydrocarbon production, but a variety of gas process atmosphere streams may be simulated for process yield analysis. Liquid receiver 66 is provided below sample material 48 to collect liquids evolving from sample material 48. Insulation 58 is placed about heater jacket 44 to maintain pressure vessel 46 at a suitable temperature and to facilitate sample material 48 replacement between experimental runs.

Reaction vessel 42 is designed to contain sample material 48 and to withstand high temperatures and rapid heat up rates. Thus, a thin walled vessel is provided to enable a high heat transfer rate to be maintained from heater jacket 44 to sample material 48. The wall thickness only needs to be designed to withstand a pressure difference of about 69 kPa (10 psi) and to be fabricated from a material compatible with the sample material under investigation.

In a preferred embodiment, reaction vessel 42 is designed to operate at a substantially steady state temperature of 1.366 K (2,000° F.) and to withstand a heat up transient from ambient to 1,366 K in a twenty minute period. Reaction vessel 42 may have a 4 in. internal diameter and a 7 ft heated length with thermocouples for instrument lines 56 spaced at 6 in. intervals. Suitable high temperature materials include Inconel 625, Hastelloy X, and Haynes 188. The experimental atmospheres expected within reaction vessel 42 include various combinations of steam, hydrogen, oxygen, nitrogen, methane, carbon monoxide, and carbon dioxide.

Heater jacket 44 is comprised of a plurality of individual heating elements spaced at 6 in. intervals along the 7 ft heated length. The heater design is selected to provide the steady state and transient temperature conditions described above in combination with the selected material and wall thickness for reaction vessel 42. Each heated zone is provided with individual control by external control system 72.

Pressure vessel 46 is provided to contain an expected range of operating pressures for process simulation. However, pressure vessel 46 has only a limited temperature range which is not expected to exceed 200° F. Consequently, an operating pressure range from atmospheric to 13,790 kPa (2,000 psi) is provided. Insulation 58 keeps the temperature of pressure vessel 46 within design limits.

In one operational test, a fossil fuel furnace reactor and control system was constructed as hereinabove described. A batch sample of 18.14 kg (40 (lb) of raw shale, equivalent to about 1.3 kg (2.86 lb) per heater jacket 44 zone was provided. Control system 72 energized sequential zones in heater jacket 44 at 1 minute intervals, to establish an equivalent sample feed rate of 1.3 kg (2.86 lb) per minute.

A microprocessor based control system 72 provided individual control for the 14 heat jacket 44 zones with a time and temperature profile provided from microprocessor control system 72. Gas product flows through inlet 62 and outlet 64 were measured for quantity and analyzed for quality. The liquid product was collected in liquid receiver 66 and was measured and analyzed when the process simulation was complete.

Operating conditions were established which were believed to favor a high gas-to-oil yield ratio. A hydrogen pressure of 3,447 kPa gauge (500 psig) was established. Each heater was set to heat up the shale sample material at a rate of 311 K (100° F.) per minute for 15 minutes, then to hold a constant temperature near 1,144K (1,600° F.) for another 10 minutes, and then to shut down. The heaters were programmed to turn on at 1-minute increments. A flow rate of pure hydrogen was established at 0.387 std $m^3$ per minute.

The shale oil sample yielded approximately 0.00076 $m^3$ (0.2 gal.) of shale oil and 0.0003 $m^3$ (0.08 gal.) of water. As expected, this oil yield was low. The product gas yield was 1.6 std $m^3$ (60.8 scf) including $CH_4$ and a wide range of other hydrocarbon components, along with $NH_3$, $H_2S$, $CO_2$, and CO.

The product yields provided by the fossil fuel furnace reactor according to the present invention and then fed back to the ASPEN software simulation to obtain an economic analysis. For example, the gaseous products can be processed to supply hydrogen for the recycle gas stream of a continuous process retort, to produce sulfur and nitrogen byproducts, and to provide a shale oil which can be graded according to marketing conditions.

It is apparent from the above description that the fossil fuel furnace reactor system according to an embodiment of the present invention provides prompt feedback for a software simulation, e.g., ASPEN. Process conditions can be set according to the software model plant conditions and a resulting product yield experimentally provided by the reactor. Another iteration of process conditions can then be simulated and the resulting yield again determined. With such feedback readily available, an optimized set of plant design and operating parameters can be established based on interrelationships between the relative gas/oil yield and composition thereof and market conditions for various grades of oil and process byproducts.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fossil fuel furnace reactor, comprising:
   an interior reaction vessel for containing a batch of sample material having a fossile fuel content, said reaction vessel having a wall thickness effective for heat transfer at a prdetermined rate to simulate a process temperature history for a selected continuous processing plant for said fossil fuel;
   a heater jacket disposed about said reaction vessel and defining a plurality of independent controllable temperature zones axially spaced along said reaction vessel; and
   a pressure vessel insulatingly disposed about said heater jacket and defining a wall thickness effective to contain an operating pressure functionally selected to simulate said continuous processing plant.

2. A fossil fuel furnace reactor according to claim 1, wherein said interior reaction vessel provides substantially equal amounts of said sample material within each of said axially spaced temperature zones.

3. A fossil fuel furnace reactor according to claim 2, further including inlet means for introducing a selected process atmosphere about said sample material and outlet means for withdrawing gases evolved from said sample material.

4. A fossil fuel furnace reactor according to claim 3, further including a liquid receiver vessel disposed beneath said sample material for receiving liquids evolved from said sample material.

5. A fossil fuel furnace reactor according to claim 2, further comprising instrumentation means selectively placed within said sample material in each said temperature zone for producing a signal functionally related to the temperature of said sample material in each said temperature zone.

6. A batch retort process for simulating the operation of a continuous fossil fuel treatment plant with process parameters defined by an analysis routine, comprising the steps of:
   placing a selected quantity of a sample material containing fossil fuels in a reaction vessel;
   defining a plurality of heating zones about said sample material;
   establishing a zone heating profile effective to simulate a time-temperature history of a selected plant design for continuously processing a feed material corresponding to said sample material; and
   sequentially energizing said heating zones along said zone heating profile and at intervals effective to simulate a material feed rate through said selected plant.

7. A batch retort process according to claim 6, further including the step of establishing a selected processing gaseous atmosphere about said sample material to effect a product yield from said sample material.

8. A batch retort process according to claim 6, further including the steps of:
   collecting liquids evolved from said sample material during said heating; and
   analyzing said liquid for constituent components for feedback to said analysis routine for optimizing operation of said continuous fossil fuel treatment plant.

* * * * *